United States Patent [19]

Rao et al.

[11] Patent Number: 5,166,011
[45] Date of Patent: Nov. 24, 1992

[54] PROCESS FOR FORMING AN ARGENTIC OXIDE CONTAINING BIPOLAR ELECTRODE AND PRODUCT PRODUCED THEREBY AND DEFERRED ACTUATED BATTERY ASSEMBLY EMPLOYING SAME

[75] Inventors: Bhaskara M. L. Rao, Flemington; William Kobasz, Edison, both of N.J.

[73] Assignee: Alupower, Inc., Warren, N.J.

[21] Appl. No.: 609,770

[22] Filed: Nov. 7, 1990

[51] Int. Cl.$^5$ .................... H01M 4/34; H01M 4/54; H01M 6/48
[52] U.S. Cl. .................... 429/219; 429/152; 429/210; 429/218; 429/245
[58] Field of Search ............... 429/210, 219, 218, 152, 429/245

[56] References Cited

U.S. PATENT DOCUMENTS

| | | | |
|---|---|---|---|
| 4,124,747 | 11/1978 | Murer et al. | 429/210 |
| 4,125,680 | 11/1978 | Shropshire et al. | 429/210 |
| 4,892,797 | 1/1990 | Rao et al. | 429/210 |
| 4,910,102 | 3/1990 | Rao et al. | 429/210 |
| 4,910,104 | 3/1990 | Rao et al. | 429/210 |

Primary Examiner—Mark L. Bell
Attorney, Agent, or Firm—Louis E. Marn

[57] ABSTRACT

There is disclosed a process for laminating a metal-based anode member to one side of a conductive intermediate layer and an argentic oxide-containing layer to the other side thereof and using a plurality of such bipolar electrodes in a battery assembly defining a compartment for passage of an alkaline medium, such as seawater, or alkali.

18 Claims, 2 Drawing Sheets

PROCESS FOR FORMING AN ARGENTIC OXIDE CONTAINING BIPOLAR ELECTRODE AND PRODUCT PRODUCED THEREBY AND DEFERRED ACTUATED BATTERY ASSEMBLY EMPLOYING SAME

BACKGROUND OF THE INVENTION

1) Field of the Invention

This invention relates to electrochemical batteries, and more particularly to an improved argentic oxide bipolar electrode for use in an electrochemical battery for marine use of improved reliability.

(2) Description of the Prior Art

Battery requirements for marine data systems vary from a few milliwatts for CMOS instrumentation to several tens of kilowatts for the operation of a mini autonomous underwater vehicle (AUv). Nonaqueous lithium cells and zinc-based primary cells, as well as nickel-cadmium and lead-acid batteries, are currently used. Safety and the corrosive nature of the electrolyte and/or some cathode materials used in such power sources dictate that cells and batteries be well sealed to prevent leakage and/or rupture during storage and use. Lithium batteries use hermetic seals with safety vents and a fuse. Alkaline cells are rendered leakproof by suitable double crimp joints. Lead-acid cells use a gelled electrolyte to prevent spillage of the electrolyte. Such techniques have minimized the hazards of handling and use, however at the expense of the costs. Sealed cells require a "pressure hull" enclosure for deep sea application and thus use of a pressure hull significantly reduces energy density and concomitantly increases usage cost. Other types of power cells used in undersea applications are water activated magnesium batteries with a bipolar configuration as open cells. A magnesium anode and a metal halide-based cathode allows the use of sea water as the electrolyte and do not require a pressure hull housing for deep sea applications.

Deferred actuated batteries, such as silver chloride-magnesium batteries using sea water as an electrolyte have been used for years, and are expensive being based upon the use of a precious metal, i.e. silver.

Aluminum-silver oxide batteries for use in electric torpedoes include bipolar electrodes formed of an aluminum alloy plate, a silver foil and an electroformed silver oxide layer containing a silver grid with silver in the argentous ionic form. Fabrication of such bipolar electrode and assembly into a battery configuration is cumbersome, costly and exceedingly unreliable due to the use of tape to hold together the bipolar electrode. There are requirements for high energy and high power density with concomitant depth independency.

In U.S. Pat. No. 4,910,104 to Rao et al. and assigned to the same assignee as the present invention, there is described a deferred actuated battery assembly for seawater activation.

OBJECTS OF THE PRESENT INVENTION

An object of the present invention is to provide an improved bipolar electrode assembly for an aluminum-silver oxide battery.

Another object of the present invention is to provide an improved bipolar electrode assembly for a deferred aluminum-silver oxide battery for improved reliability.

Still another object of the present invention is to provide an improved bipolar electrode assembly for an aluminum-silver oxide battery of facile construction.

A still further object of the present invention is to provide an improved bipolar electrode assembly for an aluminum-silver oxide battery of reduced construction costs.

Yet another object of the present invention is to provide an improved deferred actuated aluminum-silver oxide battery of enhanced power density.

Still yet another object of the present invention is to provide an improved bipolar electrode assembly for an aluminum-silver oxide battery of depth independency.

SUMMARY OF THE INVENTION

These and other objects of the present invention are achieved by laminating a metal-based anode member to one side of a conductive intermediate layer and an argentic oxide-containing layer to the other side and using a plurality of such bipolar electrodes in a battery assembly defining a compartment for passage of an alkaline medium, such as seawater, or alkali.

BRIEF DESCRIPTION OF THE DRAWINGS

Further objects and advantages of the present invention will become apparent from the following detailed description when taken with the accompanying drawing, wherein.

DETAILED DESCRIPTION OF THE INVENTION

Figure 1:
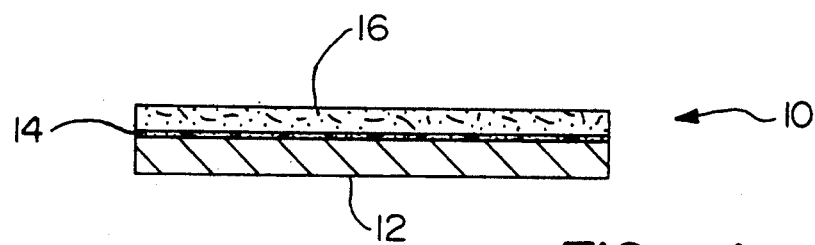
FIG. 1 is a cross-sectional view of the improved aluminum-argentic oxide bipolar electrode of the present invention.

Referring now to the drawings and particularly FIG. 1, there is schematically illustrated an integral bipolar electrode of the present invention, generally indicated as 10 including a metal-based anode member 12, an intermediate inert conductive member 14 and a cathode member 16. The metal-based negative electrode or anode member 12 is formed of a material selected from the group consisting of aluminum, aluminum alloy, magnesium, magnesium alloy and mixtures thereof of a thickness of from 2 mils to one inch, as a function of capacity.

The conductive inert intermediate member or layer 14 is comprised of carbon particle-containing plastic nickel, copper or silver foil of a thickness of from 1 to 0.05 mils. The conductive inert intermediate member or layer 14 is laminated to the aluminum anode member 12 by thermal/pressure bonding, preferably using conductive adhesive or solvent bonding techniques under conditions to maintain a low interfacial resistance to permit of large currents across the bipolar boundary. Thus, for example, with a resistance junction, the resultant 1R-loss would be 10 mv at 1A/cm2 discharge.

The positive electrode or cathode member or layer 16 is laminated by heat to the other side of the conductive inert intermediate layer 14. The positive electrode 14 is formed by admixing chemically-formed powdered argentic oxide with a material selected from the group consisting of carbon fibers, graphite fibers, nickel plated carbon fibers, nickel plated graphite fibers, silver plated carbon fibers, silver plated graphite fibers, silver fine wire, silver flakes, nickel fine wire, nickel flakes, nickel plated chopped fiber glass, silver plated chopped fiber glass or mixtures thereof, in a suitable binder medium. The binder medium includes e.g. aqueous polytetre fluoro ethylene emulsions, i.e. Teflon ® or polyvinyl chloride. The admixture is formed into a paste and is spread to an even thickness on a release substrate and subsequently dried to remove excess water, preferably less than about 20% percent by weight water.

Silver Oxide ($Ag_2O$) is the stable in positive form of the argentous ion, $Ag^+$. however, in the present invention, the argentous ion may be oxidized to the argentic form ($Ag++$) which may be effected by using strong oxidizing agents, such as sodium potassium per oxy disulfate with concomitant adjustment of pH and temperature, it being understood that silver ion is present in a combined $+1$, $+2$ or $+3$ state or a form of $Ag_xO$ wherein x is less than 2. Other forms of chemically or electrochemically-formed argentic oxide can be used in the present invention.

Figure 2:
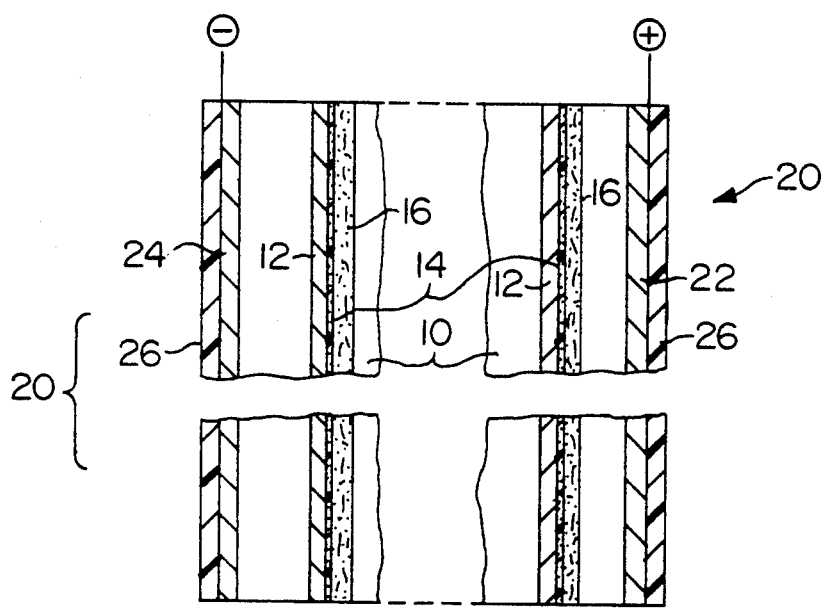
FIG. 2 is a schematic cross-sectional view of a battery assembly illustrating a flow through type configuration.

A plurality of bipolar electrodes 10 of the present invention, referring now to FIG. 2, are disposed in a battery assembly; generally indicated as 20, between an anode plate 22 and an inert cathode current collector plate 24 encased by a dielectric material 26, such as any conventional plastic material suitable for battery usage. Generally, spacing being adjacent bipolar electrodes 10 is not greater than about 0.5 inches to provide an adequacy internally-connected semi configuration. There being no top or bottom wall member, the battery assembly 20 permits the introduction as well as flow through of the alkaline electrolyte, such as seawater or alkali or a mixture thereof.

The anode plate 22 is likewise formed of a material selected from the group consisting of aluminum, aluminum alloys, magnesium, magnesium alloys and mixtures thereof with a thickness being a function of capacity as hereinabove discussed with reference to the electronegative member 12. The inert cathode current collector plate 24 is formed of an inert conducting substrate, such as nickel, carbon, silver, lead and the like.

EXAMPLE OF THE INVENTION

Operation of the process and apparatus is described in the following specific example which are intended to be merely illustrative and the present invention is not to be regarded as limited thereto.

EXAMPLE I

Sixteen grams of argentic oxide (AgO) is admixed with 12 grams water and 1.2 grams Teflon ® to form a paste spread lengthwise onto a Teflon ® coated release paper. After removal of excess water, the layer is dried at 45° C. and pressed onto a silver foil side of an aluminum/silver laminate to form a bipolar electrode.

Figure 3:
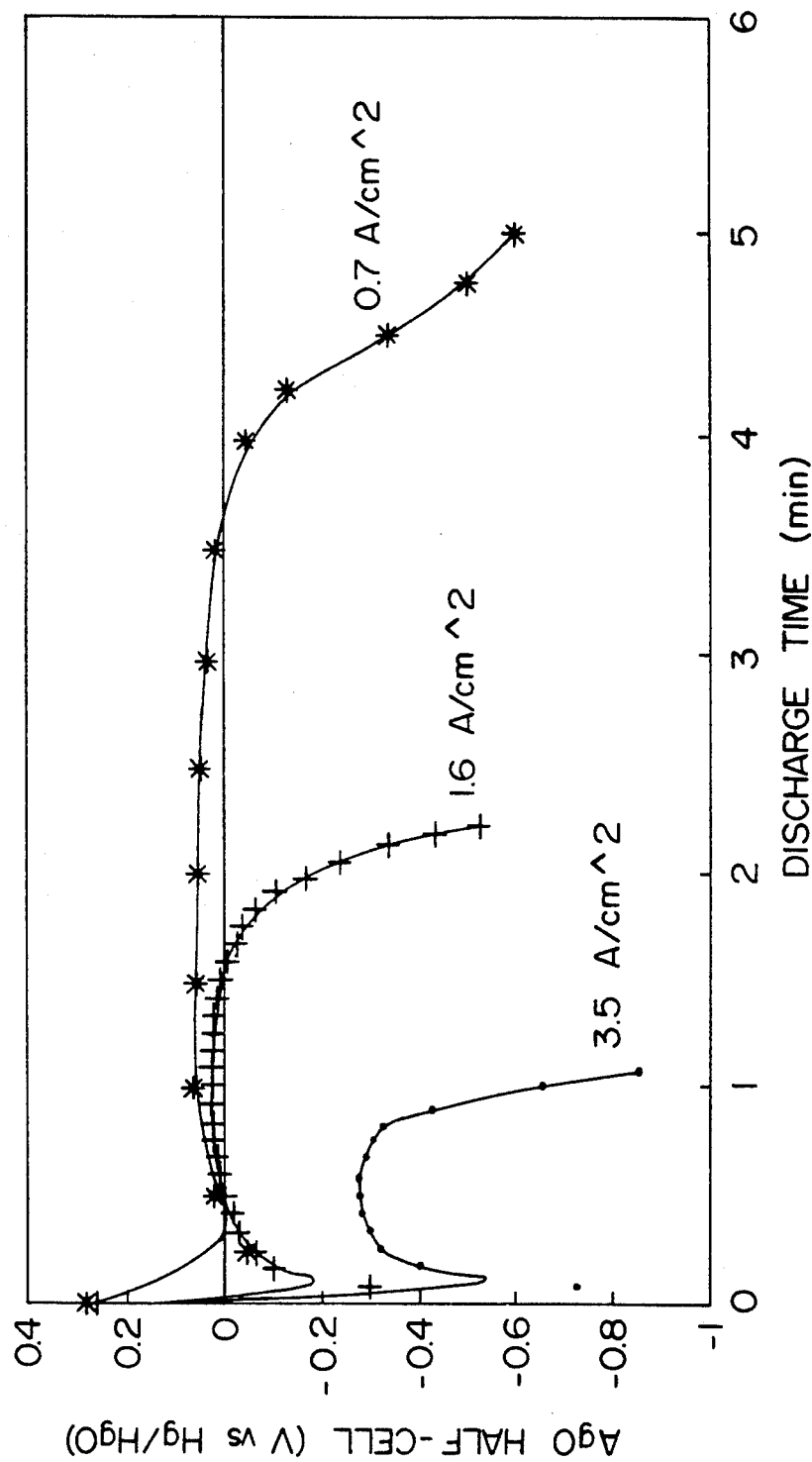
FIG. 3 is a discharge curve for an Al/AgO bipolar electrode prepared from chemically-formed argentic oxide in an aqueous solution of potassium hydroxide (4 m KOH).

The discharge curves of FIG. 3 illustrate the high rate and high efficiency of silver oxide utilization and efficacy of the improved metal-based argentic oxide bipolar electrode of the present invention.

While the invention has been described in connection with an exemplary embodiment thereof, it will be understood that many modifications will be apparent to those of ordinary skill in the art; and that this application is intended to cover any adaptations of variations thereof. Therefore, it is manifestly intended that this invention be only limited by the claims and the equivalents thereof.

What is claimed is:

1. A bipolar electrochemical electrode which comprises:
   an inert intermediate conductive layer;
   an electronegative member laminated to a side of said intermediate conductive layer and formed of a material selected from the group consisting of aluminum, aluminum alloys, magnesium, magnesium alloys and mixtures thereof; and
   an argentic oxide-containing electropositive layer laminated to another side of said inert intermediate conductive layer.

2. The bipolar electrochemical electrode as defined in claim 1 wherein said inert intermediate conductive layer is of a thickness of from 1 to 0.05 mils.

3. The bipolar electrochemical electrode as defined in claim 2 wherein said inert intermediate conductive layer is a carbon particle containing plastic and a material selected from the group consisting of carbon fibers, graphite fibers, nickel plated carbon fibers, nickel plated graphite fibers, silver plated carbon fibers, silver plated graphite fibers, silver fine wire, silver flakes, nickel fine wire, nickel flakes, nickel plated chopped fiber glass, silver plated chopped fiber glass or mixtures thereof.

4. The bipolar electrochemical electrode as defined in claim 1, 2 or 3 wherein said argentic oxide-containing electropositive layer includes a material selected from the group consisting of carbon fibers, graphite fibers, nickel plated carbon fibers, nickel plated graphite fibers, silver plated carbon fibers, silver plated graphite fibers, silver fine wire, silver flakes, nickel fine wire, nickel flakes, nickel plated chopped fiber glass, silver plated chopped fiber glass or mixtures thereof.

5. The electrochemical electrode as defined in claim 4 wherein said argentic oxide-containing electropositive layer includes a binder.

6. The electrochemical electrode as defined in claim 5 wherein said argentic oxide-containing electropositive layer contains less than about 20% percent by weight water.

7. A process for manufacturing an argentic oxide-containing bipolar electrode, which comprises:
   a) laminating an electronegative member of a material selected from the group consisting of aluminum, aluminum alloys, magnesium, magnesium alloys and mixtures thereof to a side of an inert intermediate conductive layer; and
   b) laminating an electropositive member including argentic oxide to another side of said inert intermediate conductive layer.

8. The process for manufacturing an argentic oxide-containing bipolar electrode as defined in claim 7 wherein said electropositive member is formed by admixing powdered argentic oxide in an aqueous medium with a material selected from the group consisting of carbon fibers, graphite fibers, nickel plated carbon fibers, nickel plated graphite fibers, silver plated carbon fibers, silver plated graphite fibers, silver fine wire, silver flakes, nickel fine wire, nickel flakes, nickel plated chopped fiber glass, silver plated chopped fiber glass or mixtures thereof forming said admixture into a layer and drying said thus formed layer to form said electropositive member.

9. The process for manufacturing an argentic oxide-containing bipolar electrode as defined in claim 8 and further including a binder medium in said admixture.

10. The process for manufacturing an argentic oxide-containing bipolar electrode as defined in claim 9 wherein said binder is an aqueous Teflon ® emulsion.

11. The process for manufacturing an argentic oxide-containing bipolar electrode as defined in claim 7 wherein said argentic oxide is formed by oxidizing argentous oxide in silver.

12. The process for manufacturing an argentic oxide-containing bipolar electrode as defined in claim 8 wherein drying is effected to a water content of less than 20% percent by weight.

13. An electrochemical battery assembly which comprises:
   an anode plate formed of a material selected from the group consisting of aluminum, aluminum alloys, magnesium, magnesium alloys and mixtures thereof;
   an inert cathode current collector plate; and
   a plurality of bipolar electrochemical electrodes disposed between said anode plate and said inert cathode current collector plate, said bipolar electrochemical electrodes comprises of an inert intermediate conductive layer; an electronegative member laminated to a side of said intermediate conductive layer and formed of a material selected from the group consisting of aluminum, aluminum alloys, magnesium, magnesium alloys and mixtures thereof; and an argentic oxide-containing electropositive layer laminated to another side of said inert intermediate conductive layer.

14. The electrochemical electrodes", and substitute electrochemical battery assembly; and as defined in claim 13 wherein said inert intermediate conductive layer is of a thickness of from 1 to 0.05 mils.

15. The electrochemical electrodes", and substitute electrochemical battery assembly; and as defined in claim 14 wherein said inert intermediate conductive layer is a carbon particle containing plastic and a material selected from the group consisting of carbon fibers, graphite fibers, nickel plated carbon fibers, nickel plated graphite fibers, silver plated carbon fibers, silver plated graphite fibers, silver fine wire, silver flakes, nickel fine wire, nickel flakes, nickel plated chopped fiber glass, silver plated chopped fiber glass or mixtures thereof.

16. The electrochemical electrodes", and substitute electrochemical battery assembly; and as defined in claim 12, 13, or 14 wherein said argentic oxide-containing electropositive layer includes a material selected from the group consisting of carbon fibers, graphite fibers, nickel plated carbon fibers, nickel plated graphite fibers, silver plated carbon fibers, silver plated graphite fibers, silver fine wire, silver flakes, nickel fine wire, nickel flakes, nickel plated chopped fiber glass, silver plated chopped fiber glass or mixtures thereof.

17. The electrochemical battery assembly as defined in claim 16 wherein said argentic oxide-containing electropositive layer includes a binder.

18. The electrochemical battery assembly as defined in claim 17 wherein said argentic oxide-containing electropositive layer contains less than about 20% percent by weight water.

* * * * *